Patented Dec. 5, 1939

2,182,180

UNITED STATES PATENT OFFICE 2,182,180

COMPOSITIONS FROM RUBBER AND FATTY ACIDS AND PROCESSES OF PREPARING THE SAME

Anderson W. Ralston and William M. Selby, Chicago, Ill., assignors to Armour and Company, Chicago, Ill., a corporation of Illinois No Drawing. Application December 13, 1937, Serial No. 179,592

12 Claims. (Cl. 260—108)

This invention relates to processes of preparing useful products from rubber and higher fatty acids, and it comprises processes wherein rubber is reacted with a higher fatty acid in the presence of aluminum chloride; and it further comprises, as new products, the reaction products of rubber and a higher fatty acid, which products range from soft plastic masses to hard solids of unknown composition depending on the proportions of reactants used.

Various so-called rubber derivatives have been prepared for use in the arts. For example, rubber has been reacted with chlorine gas to form chlorinated rubber. Rubber has also been reacted with hydrogen chloride to form rubber hydrochlorides, and various isomerizing agents have been used to convert rubber to hard resins useful in many relations. For example, such rubber derivatives are frequently thermoplastic and can be combined with various fillers and molded in much the same manner as many other kinds of artificial resins. Rubber derivatives of this general nature can also be dissolved in volatile solvents and sheets or films formed therefrom.

We have now discovered a new class of rubber derivatives which can be prepared readily at little expense, and which have properties suiting them for use as plastics, dielectrics, constituents of films and sheets, as thermoplastic adhesives, and in many other relations where artificial resins are employed. The products of our invention can be characterized as the reaction products of rubber and higher fatty acids. We have discovered that higher fatty acids containing more than six carbon atoms will react with rubber in the presence of catalysts commonly used in the well known Friedel-Crafts reaction. Such catalysts are generally aluminum chloride, but occasionally other chlorides, such as zinc or iron chloride, are used.

In the practise of our invention we use unvulcanized rubber, such as crude sheet rubber. We do not use latex as such but we can, of course, use latex rubber. This material is obtained by drying down or otherwise evaporating latex. The non-rubber solids in latex do not have an adverse effect on the reaction of our invention. As fatty acids we can use any fatty acids containing at least six carbon atoms. Such fatty acids are commonly referred to as higher fatty acids and they begin with caproic. Others are caprylic, capric, lauric, myristic, palmitic, stearic, arachidic, behenic, carnaubic, cerotic and melissic acids. Unsaturated fatty acids, such as oleic, linoleic and linolenic, are also useful in our process. We have found that chlorinated fatty acids, such as tetrachlorostearic or hexachlorostearic acids, will react with rubber also. Chlorinated acids prepared by chlorinating oleic, linoleic or linolenic acids or other unsaturated fatty acids can be used as starting materials. They are to be distinguished from the fatty acid chlorides, namely compounds having the formula RCOCl where R is an alkyl group. We do not use the fatty acid chlorides in our process.

As a general rule we find it advantageous to start with mixtures of acids rather than pure individual acids. This is because the mixtures are quite inexpensive and can be prepared from oils such as cottonseed oil. There is no necessity for separately purifying the fatty acids before use in this process. But, we can, of course, use pure stearic acid and other pure fatty acids if so desired.

We do not know the precise chemical composition of our reaction products. Rubber itself is a highly complex polymer, consequently when rubber is reacted with a higher fatty acid the structure of the final reaction product is undoubtedly more complex than pure rubber. The products we obtain have physical and chemical properties much different from rubber and fatty acids. The fatty acids are quite reactive in the presence of a Friedel-Crafts catalyst and the carboxyl radical of the acid probably reacts with the rubber molecule in the presence of aluminum chloride to form highly complex derivatives. Since rubber is unsaturated it is equally probable that reactions may take place at the olefinic bond, which reactions may be followed by internal rearrangements thus giving highly complex compounds.

It would serve no useful purpose for us to describe the use of every higher fatty acid in our process. Consequently, we shall limit our description to a reasonable number of examples to illustrate the general method by which our compounds are prepared.

For example, we dissolve or swell 50 parts by weight of crude unvulcanized rubber with 100 parts by weight of tetrachlorethane or other inert rubber solvent. This gives us a clear amber colored solution or suspension of rubber and solvent. To this solution we add about 40 parts by weight of stearic acid. The mixture is stirred for about a half an hour and then we add about 40 parts by weight of aluminum chloride. It is advantageous to add the catalytic material quite slowly in order to avoid hidden temperature rises.

We most always begin at room temperature and during the addition of aluminum chloride the reaction mixture gradually warms up. A temperature rise of 10° C. to 15° C. is commonly noted. After the addition of the aluminum chloride the reaction mixture is then refluxed for about 6 hours at 140° C. We believe that these steps result in the formation of a complex intermediate aluminum compound analogous to the well-known Friedel-Crafts intermediate, and consequently the reaction product must be hydrolyzed to free it of aluminum. After refluxing we cool the reaction vessel and its contents is added slowly to a mixture of ice and hydrochloric acid. In this manner we obtain a creamy white plastic mass which floats upon the layer of hydrochloric acid and aluminum salts. The mixture is then heated in the presence of the hydrochloric acid for a sufficient length of time to complete the hydrolysis. The mixture is then subjected to steam distillation until the tetrachlorethane has been completely removed. The reaction product does not steam distil over but remains as a layer floating on the aqueous layer of aluminum chloride. After the steam distillation is completed, and small samples of the reaction product show that it is substantially free of aluminum, we draw off the lower aqueous layer and wash the final product with dilute sodium hydroxide solution to free it from acids. This process also removes any stearic acid which has not reacted with the rubber. After drying we obtain a hard, white plastic mass which is useful in many relations given above.

When we proceed in like manner but use oleic acid in place of stearic acid and reduce the amount of oleic acid to 15 parts by weight to 50 parts by weight of crude rubber, we obtain, after hydrolysis, a pliable plastic material which has properties intermediate between those of rubber and wax. This product is useful for impregnating fabrics, waterproofing cloths, etc.

When we react 25 parts by weight of linolenic acid with 50 parts by weight of crude rubber in the presence of aluminum chloride and a rubber solvent, a vigorous reaction is obtained. If the proportion of linolenic acid to rubber is increased the final reaction products (after hydrolysis as described above) are hard plastic materials, and if smaller amounts of linolenic acid are employed the products are soft plastic masses.

When chlorinated fatty acids are employed, such as chlorinated oleic acid or chlorinated linolenic acid, a very vigorous reaction sets in. The products are hard plastic masses soluble in most organic solvents and solutions of these products can be employed as protective coatings for wood, metal and other objects.

Mixtures of higher fatty acids, such as those obtained from lard, behave generally in the same way as pure acids. We can, of course, use various solvents for the rubber provided the solvents employed are inert. One solvent which we can use is kerosene, or we can use other hydrocarbon solvents provided they are non-reactive. In a number of instances the reaction is difficult to start and where higher temperatures are required it is advantageous to use higher-boiling solvents. The reflux temperature is dependent upon the boiling point of the solvent.

We have given a representative range of amounts of higher fatty acids. Naturally we always use enough higher fatty acid to definitely modify the physical and chemical properties of the rubber. But otherwise we do not wish to be limited to any specific proportions. We have, however, noted the effect of varying the proportions.

As stated, we customarily use unvulcanized rubber. By this we mean ordinary crude rubber as purchased in the open market. Such rubber, however, may have been subjected to washing treatments to free it of various impurities and by the language "unvulcanized rubber" in the appended claims we wish to embrace the various kinds of unvulcanized rubber available in the open market.

Since our products are condensation products and their chemical constitution is unknown we are obliged to define them as condensation reaction products from rubber and a fatty acid containing at least six carbon atoms. The catalysts effective are those catalysts generally associated with the Friedel-Crafts reaction. Although aluminum chloride is the more usual catalyst occasionally other metal chloride catalysts have been used in this general reaction. The amount of catalyst is not critical but it is advantageous to use about as much catalyst as fatty acid. This is because we believe complex molecular compounds containing aluminum are formed as intermediates and something approaching stoichiometric ratios of aluminum chloride and fatty acids are desirable. Mere traces of catalyst do not work well and consequently it is better to use sizable amounts, generally not less than a half of the weight of the fatty acid present.

In every instance the intermediate aluminum-containing reaction product must be hydrolyzed in accordance with the methods customarily employed for making Friedel-Crafts acylation products.

Thus our invention is to be distinguished from any process which reacts fatty acids with rubber in the absence of a catalyst, or in the presence of such small amounts of catalysts that complex catalyst-containing intermediate products requiring hydrolysis are not obtained. As stated, our process consists in reacting the rubber with the fatty acid in the presence of a Friedel-Crafts catalyst used in proportions giving an intermediate product, followed by hydrolysis of the intermediate product to liberate the final reaction product.

Having thus described our invention, what we claim is:

1. The condensation reaction product of unvulcanized rubber and a fatty acid containing at least six carbon atoms, prepared by reacting a rubber solution with said fatty acid in the presence of a Friedel-Crafts reaction product, and hydrolyzing an intermediate, catalyst-containing reaction product to obtain said condensation reaction products.

2. The condensation reaction product of unvulcanized rubber and stearic acid, prepared by reacting a rubber solution with said fatty acid in the presence of a Friedel-Crafts reaction product, and hydrolyzing an intermediate, catalyst-containing reaction product to obtain said condensation reaction products.

3. The condensation reaction product of unvulcanized rubber and oleic acid, prepared by reacting a rubber solution with said fatty acid in the presence of a Friedel-Crafts reaction product, and hydrolyzing an intermediate, catalyst-containing reaction product to obtain said condensation reaction products.

4. The condensation reaction product of unvulcanized rubber and lard fatty acids, prepared by reacting a rubber solution with said fatty acid in the presence of a Friedel-Crafts reaction product, and hydrolyzing an intermediate, catalyst-containing reaction product to obtain said condensation reaction products.

5. The process which comprises reacting by Friedel-Crafts synthesis unvulcanized rubber while dissolved in a solvent with a fatty acid having at least six carbon atoms.

6. The process as in claim 5 wherein the fatty acid is stearic acid.

7. The process as in claim 5 wherein the fatty acid is oleic acid.

8. The process as in claim 5 wherein the fatty acids are lard fatty acids.

9. The process which comprises dissolving unvulcanized rubber in a solvent therefor, admixing a fatty acid containing at least six carbon atoms therewith, adding aluminum chloride thereto, heating the reaction mixture and, after the reaction is complete, hydrolyzing the reaction mixture to liberate an aluminum free reaction product.

10. The process as in claim 9 wherein the fatty acid is stearic acid.

11. The process as in claim 9 wherein the fatty acid is oleic acid.

12. The process as in claim 9 wherein the fatty acids are lard fatty acids.

ANDERSON W. RALSTON.
WILLIAM M. SELBY.